(12) United States Patent
Chapero-Rueda et al.

(10) Patent No.: US 9,071,916 B2
(45) Date of Patent: Jun. 30, 2015

(54) TELEPHONE TO HEARING DEVICE COMMUNICATION

(75) Inventors: Valentin Chapero-Rueda, Wollerau (CH); Andi Vonlanthen, Remetschwil (CH); Lukas Florian Erni, Zurich (CH); Stefan Haenggi, Bern (CH)

(73) Assignee: PHONAK AG, Stafa (CH)

( * ) Notice: Subject to any disclaimer, the term of this patent is extended or adjusted under 35 U.S.C. 154(b) by 452 days.

(21) Appl. No.: 12/921,589

(22) PCT Filed: Mar. 11, 2008

(86) PCT No.: PCT/EP2008/052874
§ 371 (c)(1),
(2), (4) Date: Sep. 9, 2010

(87) PCT Pub. No.: WO2008/071807
PCT Pub. Date: Jun. 19, 2008

(65) Prior Publication Data
US 2011/0007916 A1    Jan. 13, 2011

(51) Int. Cl.
*H04R 25/00* (2006.01)
*H04M 1/247* (2006.01)
*H04M 1/60* (2006.01)

(52) U.S. Cl.
CPC ........... *H04R 25/554* (2013.01); *H04M 1/2474* (2013.01); *H04M 1/605* (2013.01); *H04M 1/6066* (2013.01); *H04R 25/43* (2013.01); *H04R 25/552* (2013.01)

(58) Field of Classification Search
CPC .... H04R 25/407; H04R 25/453; H04R 25/50; H04R 25/505; H04R 25/554; H04R 25/43; H04R 25/552; H04R 25/558; H04R 25/70; H04R 2225/55; H04R 2225/61; H04R 2225/41; H04R 2420/07; H04R 2499/11; H04R 2201/107; H04R 2460/07; H04M 1/6066; H04M 1/6058; H04M 1/72572; H04M 1/72577; H04M 1/215; H04M 1/2475; H04M 1/0274; H04M 1/03; H04M 1/2155; H04M 1/605; H04M 1/72591; H04M 2250/12; H04S 5/00; H04S 2400/01; H04S 2420/01; H04S 1/007; H04B 1/385; H04B 1/1615; H04B 5/02; H04B 5/06; Y02B 60/50; G11B 27/36; H04W 52/0274; H04W 52/028
USPC ........ 381/315, 314, 321, 320, 23.1, 317, 318, 381/102, 104, 105, 106, 107, 109, 111, 120, 381/74, 26, 92, 119, 122, 61, 56, 328, 326, 381/329, 330, 331, 327; 455/556.1, 556.2, 455/557, 553.1, 3.06, 41.2, 567, 418; 379/52, 390.01, 395, 395.01, 347, 379/388.03
See application file for complete search history.

(56) References Cited

U.S. PATENT DOCUMENTS 3,059,347 A * 10/1962 Warner et al. ................. 434/157
5,553,152 A    9/1996 Newton
(Continued)

FOREIGN PATENT DOCUMENTS

EP    1398994 A2    3/2004
EP    1879426 A2    1/2008
(Continued)

OTHER PUBLICATIONS

International Search Report for PCT/EP2008/052874 dated Mar. 3, 2009.

*Primary Examiner* — Leshui Zhang
(74) *Attorney, Agent, or Firm* — Pearne & Gordon LLP

(57) ABSTRACT

A telephone handset (1), e.g. a mobile phone, is equipped with an add-on module (41). Thereby, the module (41) comprises a microphone unit (9*a*) which is operated instead of the microphone unit intrinsically provided in the handset (1). Further, the module (41) comprises a short-range wireless transmission unit (23*a*) which is operated instead of a speaker unit (7) which is intrinsically provided in the handset (1). The short-range wireless communication unit (23*a*) establishes communication with a respective short-range wireless communication unit (19*a*) in a hearing device (10) as soon as a distance between the telephone handset (1) and the hearing device (10) drops below a predetermined threshold value as detected by a distance detection unit (21).

8 Claims, 7 Drawing Sheets

(56) References Cited

U.S. PATENT DOCUMENTS

Figure 1:
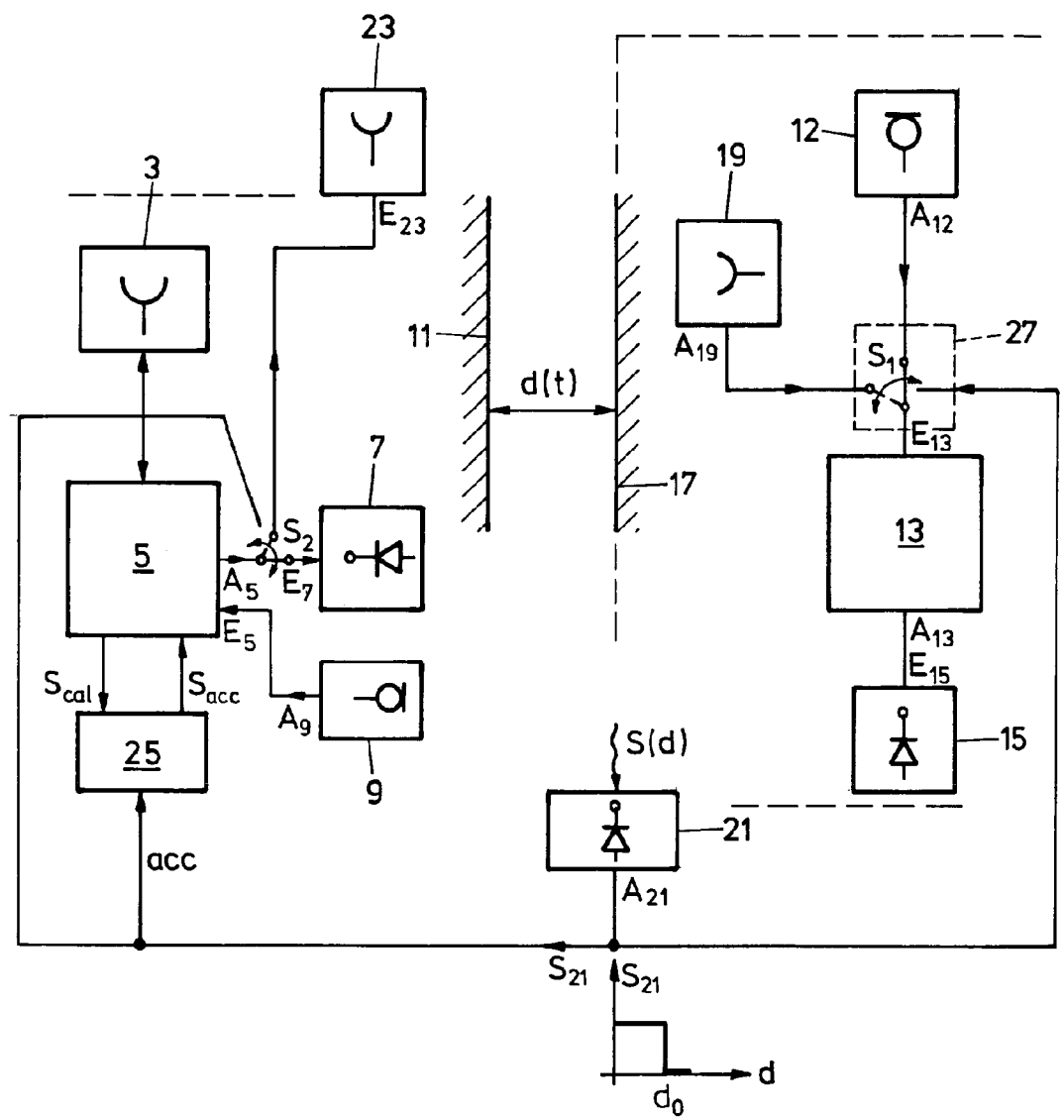

| | | |
|---|---|---|
| 5,687,242 A | 11/1997 | Iburg |
| 5,721,783 A * | 2/1998 | Anderson ................ 381/328 |
| 2003/0044033 A1* | 3/2003 | Julstrom et al. ........... 381/315 |
| 2003/0215106 A1* | 11/2003 | Hagen et al. ............. 381/313 |
| 2004/0052391 A1* | 3/2004 | Bren et al. .............. 381/331 |
| 2004/0136555 A1 | 7/2004 | Enzmann |
| 2004/0252855 A1 | 12/2004 | Vasserman et al. |
| 2006/0089174 A1* | 4/2006 | Twerdahl ................ 455/567 |
| 2006/0109994 A1 | 5/2006 | Husung et al. |
| 2007/0086600 A1 | 4/2007 | Boesen |
| 2008/0008341 A1* | 1/2008 | Edwards ................. 381/315 |
| 2008/0095391 A1* | 4/2008 | Boor .................... 381/326 |

FOREIGN PATENT DOCUMENTS

| | | |
|---|---|---|
| GB | 2363540 A | 12/2001 |
| WO | 98/08333 A1 | 2/1998 |
| WO | 01/52597 A1 | 7/2001 |
| WO | 2006/117439 A1 | 11/2006 |
| WO | WO 2006117439 A1 * | 11/2006 |
| WO | 2008/006772 A2 | 1/2008 |

* cited by examiner

TELEPHONE TO HEARING DEVICE COMMUNICATION

DEFINITIONS

The following terms are used throughout the present description and claims with the following meaning:

Hearing Device

We understand under a "hearing device" a device which is worn adjacent to or in an individual's ear with the object to improve individual's acoustical perception. If the hearing device is tailored so as to improve the perception of a hearing impaired individual towards hearing perception of a "standard" individual, then we speak of a hearing aid device, a sub-group of a "hearing device". With respect to the application area, a hearing device may be applied behind the ear, in the ear, completely in the ear canal or may be implanted. A hearing device comprises a microphone arrangement and an output electrical to mechanical converter unit. Latter is realized as a speaker unit, if the output of the hearing device is a sound pressure acoustical signal. The addressed output converter may on the other hand generate a mechanical output movement which is coupled to members of individual's ear. This is especially valid in implanting technique. Nevertheless, when we refer to a "speaker unit" a general "electrical to mechanical" converter is to be understood.

A "hearing device system" may comprise a single hearing device applied at one individual's ear or may comprise two hearing devices, one applied at each of individual's ears. If in latter case there is established, system-inherently, audio signal intercommunication between the two hearing devices, then we address such hearing device system as a "binaural hearing device system".

We understand under "audio signals" electrical or optical signals which represent acoustical signals.

We understand under a "wireless long-range audio signal communication" a wireless communication of audio signals which may be established over distances of several 100 m. Thus, the intrinsic communication ability of a mobile phone to communicate with public network antennas establishes a wireless long-range audio signal communication. Similarly, the communication established between a telephone handset and a desk station is considered to be such a wireless long-range audio signal communication.

We understand under a "wireless short-range audio signal communication" a wireless communication which may be established up to distances up to approx. 100 m. A typical example for short-range communication is communication based on BLUETOOTH technology.

We understand under "very short-range audio signal communication units" wireless communication units which may be established for a maximum distance of approx. 1 m.

We understand under "attenuation" the inverse of amplification, i.e. dampening a signal as may be addressed by −db.

We understand under an "audio system" a system which generates audio signals at an output or acoustical signals if such audio system is intrinsically equipped with a speaker unit.

The present invention departs primarily from needs of individuals wearing a hearing device system to optimally communicate with a telephone handset. In context with the present invention under a first aspect so as to satisfy such needs, several technical complexes are proposed which per se are considered as respective inventions too. Thus, the present invention is directed under a first aspect:

on a method for establishing wireless communication between a telephone handset and a hearing device system as well as on a communication system which comprises a telephone handset and a hearing device system. Under this aspect the present invention is also directed on a plug-in module by which especially existing mobile phones may be flexibly adapted to become applicable in the method and system as addressed.

Under a further aspect the present invention is directed on a method and a system for communicating between an existing audio system and a hearing device system.

Still under a further aspect the present invention is directed on a method and a system for controlling the operation of a hearing device system having two hearing devices, especially being a binaural hearing device system by which, flexibly, one of the two hearing devices may be established as the master hearing device, relative to the other slave hearing device as concerns audio signals received and transmitted to the speaker units of the overall hearing device system.

1.) Telephone to Hearing Device System Communication

As was addressed it is an object of the present invention to improve or optimize the communication between a telephone handset and a hearing device system. Thereby, the telephone handset may be a mobile phone or may be the handset of a telephone system, whereat wireless long-range communication is established between the addressed handset and a desk station of the telephone system. The addressed object is resolved by the method for establishing wireless communication between a telephone handset and a hearing device system which latter comprises at least one hearing device with a microphone unit, the output of which being operationally connected to an input of a speaker unit at said one hearing device, the method comprising the steps of monitoring when the mutual distance of said one hearing device and said telephone handset becomes shorter than a predetermined distance threshold;

if latter prevails, establishing a wireless short-range audio signal communication from the telephone handset to the one hearing device and establishing an input signal to the speaker unit to be at least predominantly governed by audio signals transmitted by the wireless short-range audio signal communication.

In one embodiment of the addressed method, the wireless short-range audio signal communication is disabled when or after the mutual distance between the telephone handset and the one hearing device becomes larger than a predetermined distance threshold. Thereby, a predetermined time span may be selected for disabling the addressed communication after the mutual distance has become larger than the threshold. This allows, during the addressed time span, e.g. to deposit the handset anywhere without disabling the wireless short-range audio signal communication up to lapse of the addressed time span.

In a further embodiment of the method according to the present invention the wireless short-range audio signal communication is disabled by operating a key on the telephone handset. By this technique once the wireless short-range audio signal communication is established, the individual is free e.g. to deposit the handset wherever and as long as desired without interrupting the communication.

In a further embodiment of the method according to the present invention combined with one or more than one of the just addressed specific embodiments, establishing the input signal of the speaker unit to be at least predominantly governed by the audio signal as transmitted by the wireless short-range audio signal communication comprises attenuating an output signal of the microphone unit within the operational connection between the output of said microphone unit and the input to the speaker unit.

Thereby, such attenuation may be selected not to be infinite, which in fact would mean disabling operational connection between the output of the microphone unit and the input of the speaker unit, but to maintain, still significantly attenuated, the addressed output signal perceivable by the individual from the speaker unit. This may be desired so as not to completely isolate the individual from the actual acoustical surrounding whenever the wireless short-range audio signal communication is established.

Still in a further embodiment of the method according to the present invention, which may be combined with any of the just addressed specific embodiments and wherein the hearing device system comprises a second hearing device with a second microphone unit, the output of which being operationally connected to an input of a second speaker unit, there is further established attenuating the output signal of the second microphone unit between the output of the addressed second microphone unit and the input to the second speaker unit. Thus, whenever the addressed wireless short-range audio signal communication is established, perception of acoustical signals impinging on the second microphone unit is attenuated. This improves perception at the one hearing device of audio signals as transmitted by the wireless short-range audio signal communication.

Thereby and as a further embodiment, wherein the one and the second hearing device are in mutual audio signal communication and thus the hearing device system is a binaural hearing device system, an output signal from the second microphone unit is attenuated between the output of the addressed second microphone unit and the input to the one speaker unit of the one hearing device. The just addressed attenuation may be selected infinite, which means that the individual will not perceive at the speaker unit of the one hearing device acoustical signals which impinge on the second microphone unit adjacent or in the second ear. Nevertheless, it might be desired not to completely disable this cross-communication, e.g. for safety reasons and to make the addressed acoustical signals, attenuated less than infinitely, still perceivable by the individual at the addressed speaker unit.

Thereby, the audio signals at the output of the wireless short-range audio signal communication unit at the one hearing device may be exclusively operationally connected to the one speaker unit or equally or attenuated as desired additionally to the second speaker unit of the second device.

In a further embodiment of the method according to the present invention, which may be combined with any of the specific embodiments as were addressed, the wireless short-range audio signal communication is established from a wireless short-range audio signal communication ability as provided within the telephone handset, thus as an example making use of such wireless short-range communication ability based on BLUETOOTH technology.

In a further embodiment of the method according to the present invention which may be combined with all specific embodiments with the exception of that embodiment which makes use of wireless communication abilities built in the handset, a module is plugged to the telephone handset and there is established the addressed wireless audio signal communication from said module to the one hearing device.

Thereby, the wireless short-range communication between the telephone handset and the hearing device may be tailored to specifically suit technical requirements at the hearing device, as e.g. with respect to power consumption, and the addressed communication may be realized as a very short-range audio signal communication with a communication range of approx. 1 m to 2 m or even less.

In a further embodiment based on the just addressed module approach the module is plugged to the telephone handset equally as a wired hands-free communication headset would be plugged thereto and there is established an interconnection between a pin of the telephone handset for a headset speaker to a wireless short-range communication unit in the module and there is further established an interconnection between a pin of the telephone handset for a headset microphone to a microphone unit in the module. Thereby, the telephone handset "sees" a wired hands-free operation headset when the addressed module is plugged in, and thus performs intrinsic headset control as e.g. switching off the microphone and the speaker of the handset, whereby in the module the speaker is replaced by the wireless short-range audio signal communication unit and the microphone of the handset is replaced by the microphone unit in the module. Thus, by such module it becomes possible to adapt practically every mobile phone as one specific type of the addressed telephone handsets for the method according to the invention.

The addressed object is further resolved by the communication system which comprises
  a telephone handset with a wireless short-range audio signal communication unit;
  a hearing device system comprising at least one hearing device,
wherein the hearing device comprises a microphone unit, the output of which being operationally connected to an input of a speaker unit of said one hearing device. The hearing device further comprises a wireless short-range audio signal communication unit, the output of which being operationally connected to the input of the speaker unit. The communication system further comprises a distance detecting unit which generates a control signal whenever a distance between the telephone handset and the one hearing device drops below a predetermined threshold. The control signal establishes operational connection from the wireless short-range audio signal communication unit of the telephone handset via the wireless short-range audio signal communication unit of the one hearing device to the input of the speaker unit and additionally causes increased attenuation of an output signal of the microphone unit between the output of the addressed microphone unit and the input to the speaker unit.

In one embodiment of the communication system according to the present invention, the distance detecting unit generates a further control signal whenever the distance between the telephone handset and the hearing device rises above the distance threshold or a further distance threshold. Thereby, such further control signal at least initiates disabling of the operational connection from the wireless short-range audio signal communication unit of the telephone handset via the wireless short-range audio signal communication unit of the one device to the input of the speaker unit. In one case, as was addressed above, the further control signal disables the addressed operational connection, in another by such further control signal a time span is initiated during which the operational connection as addressed is kept enabled up to lapse of such time span.

In a further embodiment which possibly may be combined with the just addressed specific embodiment, the communication system according to the invention comprises a manually operable key at the telephone handset which interrupts, upon operation, the operational connection from the wireless short-range audio signal communication unit of the telephone handset via the wireless short-range audio signal communication unit of the one device to the input of the speaker unit.

In a further embodiment of the communication system according to the present invention and which may be combined with all the specific embodiments of such system as were addressed, the hearing device system comprises a further hearing device with a further microphone unit, the output of which being operationally connected, via an attenuation unit with a control input for the attenuation, to an input of a further speaker unit at the further hearing device. Thereby, the control signal generated by the distance detecting unit is operationally connected to the control input and establishes for an increased attenuation at the attenuation unit.

In a further embodiment which is to be combined with the just addressed embodiment of the communication system according to the present invention, the addressed communication system further comprises a further controlled attenuation unit with a further control input. The further attenuation unit is operationally interconnected between an output of the further microphone unit and the input of the one speaker unit at the one device. The control signal is further operationally connected to the further control input and establishes at the further attenuation unit an increase of attenuation.

Still in a further embodiment of the communication system according to the present invention which may be combined with all of the just addressed specific embodiments of such system, the wireless short-range audio signal communication unit of the telephone handset is a unit intrinsically integrated into the telephone handset, e.g. a BLUETOOTH unit in a mobile phone.

According to a further embodiment of the communication system according to the present invention and which may be combined with any of the previously addressed specific embodiments of such system, the telephone handset comprises a telephone handset unit and a plug-on module removably applicable to the telephone handset unit. The telephone handset unit has a plug-in pin for tapping off an input signal to a speaker unit of the telephone handset unit. The module comprises the wireless short-range audio signal communication unit of the telephone handset, the input of said unit being operationally connected and plugged to said pin.

In a further embodiment of the communication system according to the present invention according to the just addressed specific embodiment the telephone handset unit has a further plug-in pin for an input audio signal input to the telephone handset unit. The module comprises a microphone unit which is operationally connected and plugged to the addressed further pin of the telephone handset unit.

In a further embodiment of the communication system in the specific embodiments as just addressed the telephone handset unit comprises a connecting pin arrangement for a wired hands-free operation unit, as for a headset, and the module is plugged to the addressed pin arrangement.

The present invention under the aspect considered is further directed on a plug-on module for a telephone handset which latter has a connector for a wired hands-free operation set. The module comprises an input pin for audio signals which pin is operationally connected to a wireless short-range audio signal communication unit in said module. The module further comprises an output pin which is operationally connected to an output of a microphone unit in the module. The two addressed pins of said module are part of a connector to the addressed connector of the telephone handset.

2.) Audio Device to Hearing Device Wireless Communication

One aspect which has been incorporated into the telephone to hearing device communication system and method as addressed above is to establish wireless communication between an audio device and a hearing device. Thereby and under this aspect it has been addressed, how an existing audio device, namely a telephone handset unit, may be adapted for such wireless communication without any constructional changes to such audio device and without any programming changes. This has been resolved by applying a plug-on module to the telephone handset unit, especially to a mobile phone. Under a more generic point of view this concept allows establishing a wireless communication between an audio device and a hearing device and is considered per se as an invention.

Under this aspect the present invention is a method for establishing wireless audio signal communication from an audio device having an audio signal output connector and a hearing device system comprising a wireless audio signal reception unit, the method comprising adapting the audio device for wireless audio signal communication with the hearing device system by removably applying a wireless audio signal transmission unit to the output connector as a removable module.

Accordingly, the invention is directed under this aspect on an audio system which comprises an audio device with an audio signal output connector and a hearing device system with a wireless audio signal reception unit, a plug-on module with a wireless audio signal transmission unit removably plugged to said output connector and communicating with the wireless audio signal reception unit of the hearing device system.

3.) Operation Control in Master/Slave Mode

In context with the first aspect of the present invention, namely establishing telephone handset to hearing device communication, we have addressed that whenever a telephone handset is brought near to one hearing device applied to the one ear of an individual wearing a hearing device system with two hearing devices, the hearing device at the addressed one ear becomes the master device with respect to audio signals impinging on the hearing device system. Which of the two hearing devices selectively becomes the master is governed by a manual action performed by the individual. Thus, under a more generic aspect it is recognized that in some cases it is desired to establish such master/slave operating mode of a two-hearing device system willingly by the individual wearing such system.

This object is resolved by the invention under a further aspect, namely by a method for controlling operation of a hearing device system which comprises a first hearing device with a first microphone unit, the output of which being operationally connected to an input of a first speaker unit of said first hearing device. The hearing device system further comprises a second hearing device which comprises a second microphone unit with an output operationally connected to the input of a second speaker unit of the second hearing device. The method comprises manually generating a control signal which controls an increase of attenuation of a signal transmitted from one of the first and second microphone units respectively to at least one of the first and second speaker units.

Under one aspect of the addressed method for controlling the control signal additionally controls an increase of an attenuation of an audio signal which is transmitted from one of the first and second microphone units to the input respectively of the second or first speaker units.

Thus, upon manually generating the control signal the output signal of one of the two microphone units is attenuated with respect to its influence on the one and/or on both speaker units, whereas the influence of the other microphone unit or, more generically, the influence of an audio signal received at one hearing device, is kept unattenuated with respect to its influence on one or on both speaker units.

In further embodiments of the addressed method which may be combined with the just addressed specific embodiment of such method according to the present invention, generating the control signal is established by approaching a member towards one of the hearing devices or by manually operating a key on one of the hearing devices.

Under the presently discussed aspect the present invention is further a hearing device system which comprises a first hearing device with a first microphone unit, the output of which being operationally connected to a first speaker unit of the first hearing device. There is further provided at the system a second hearing device which comprises a second microphone unit, the output of which being operationally connected to an input of a second speaker unit of the second hearing device. There is further provided a first controllable attenuation unit with a control input, this attenuation unit being operationally interconnected between the output of the first microphone unit and the input of the first speaker unit. Still further, there is provided a second controlled attenuation unit with a control input, this second attenuation unit being interconnected between the output of the second microphone unit and an input of the second speaker unit. There is further provided a manually operable control member which generates a control signal upon manual operation. The control signal is operationally connected to one of the addressed control inputs of the first and second attenuation units. Thereby, the addressed control signal leads to increasing the attenuation in the respective attenuation unit.

In one embodiment of the hearing device system according to the presently discussed aspect of the present invention, such system further comprises a third controlled attenuation unit interconnected between the output of the second microphone unit and the input of the first speaker unit. The system further comprises a fourth controlled attenuation unit with a control input which fourth attenuation unit is interconnected between the output of the first microphone unit and the input of the second speaker unit. Thereby, the control signal is further operationally connected to one of the control inputs of the third and fourth controlled attenuation units and controls the respective attenuation unit to increase attenuation.

Still in a further embodiment of the system according to the present invention under the just discussed aspect, the manually operable control member comprises a first manually operable member for the first hearing device and a second manually operable member for the second hearing device.

If operating the addressed first manually operable member at the first hearing device shall establish that first device as the master, then the second and if provided the third attenuation units become controlled to increase attenuation. If on the other hand manually operating the addressed first manually operable member at the first hearing device shall establish the first device to be the slave, then attenuations at the first and, if provided, at the fourth attenuation units are increased, leading to the second hearing device becoming the master.

In a further embodiment of the present invention under the just discussed aspect the manually operable control member comprises a distance detection unit and manually generating the control signal is performed whenever a solid member is approached nearer one of the hearing devices than defined by a pre-established distance threshold.

Figure 2:
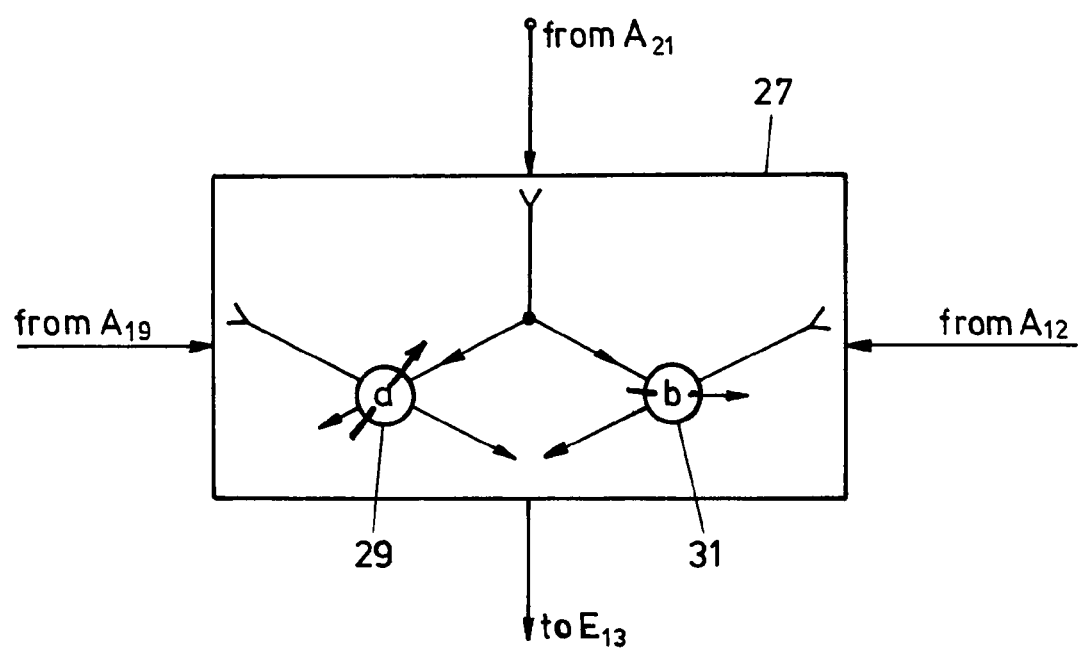
Figure 3:
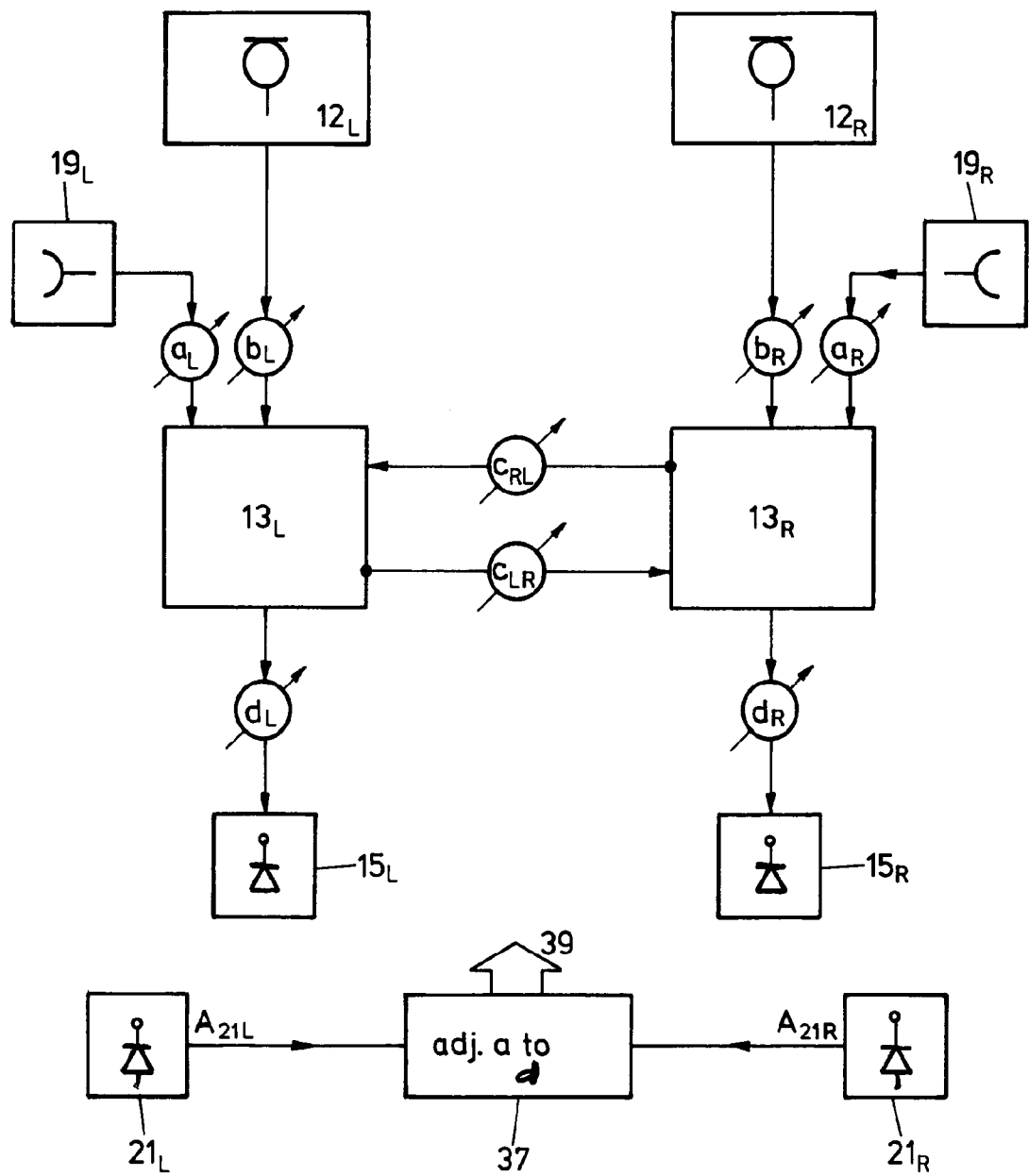
Figure 4:
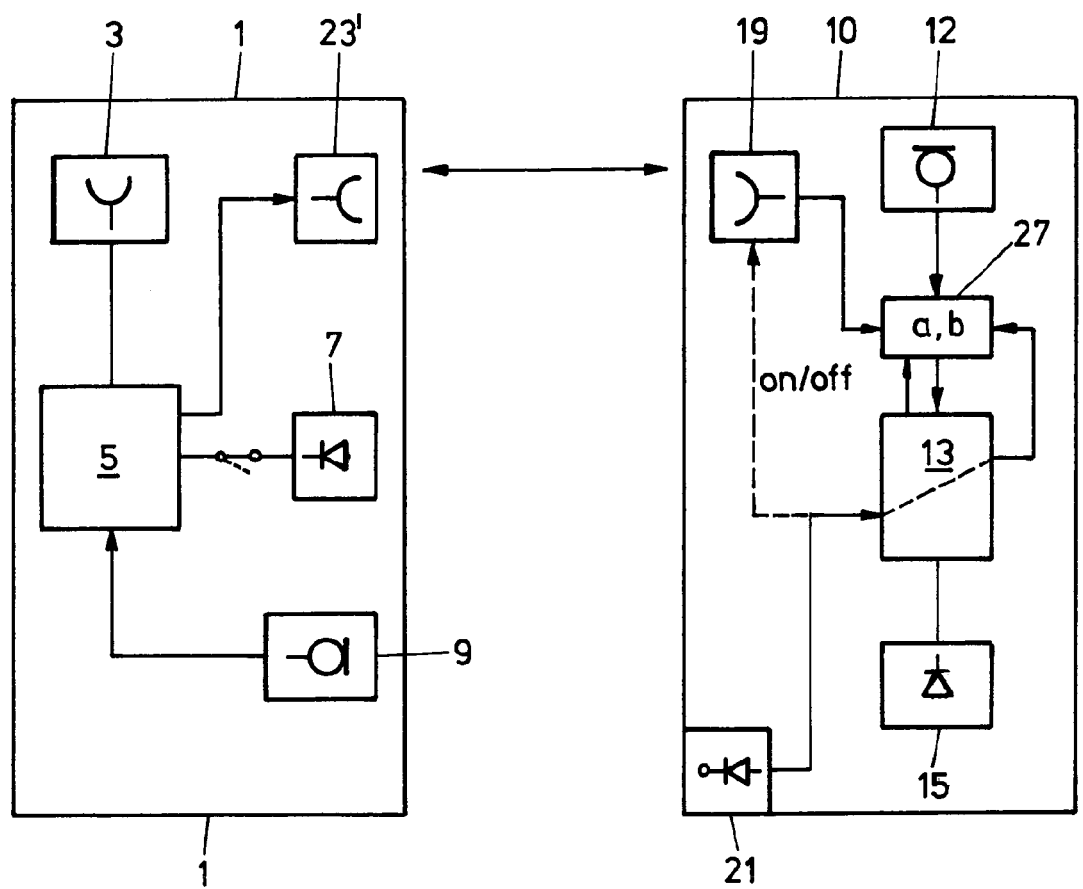
Figure 5:
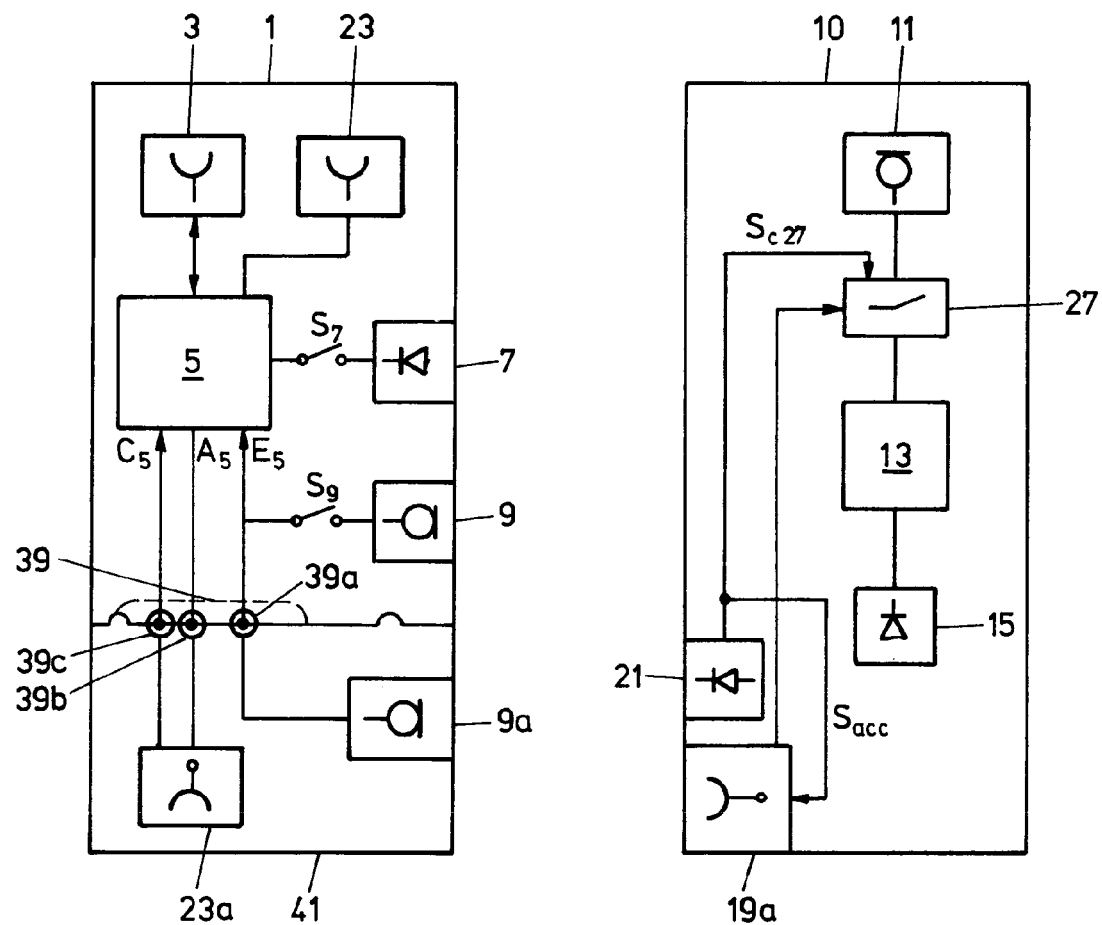
Figure 6:
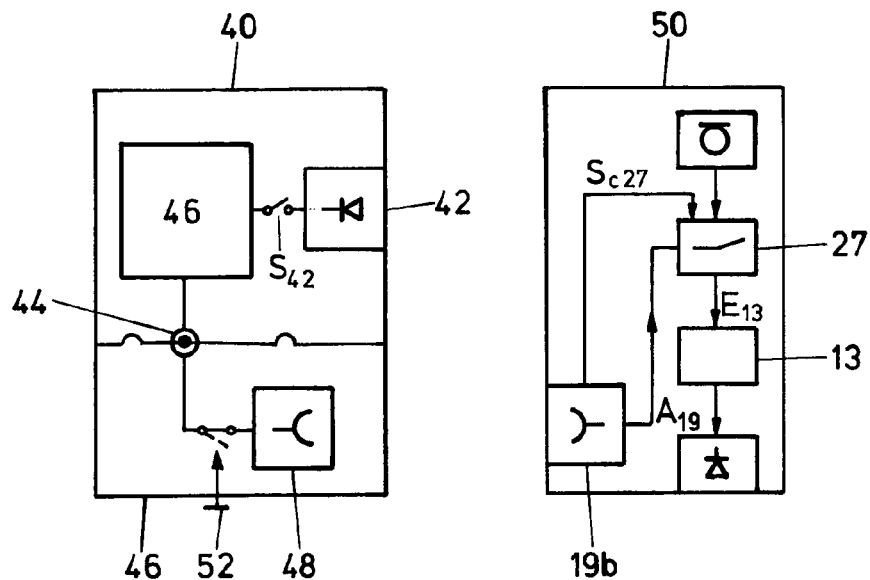
Figure 7:
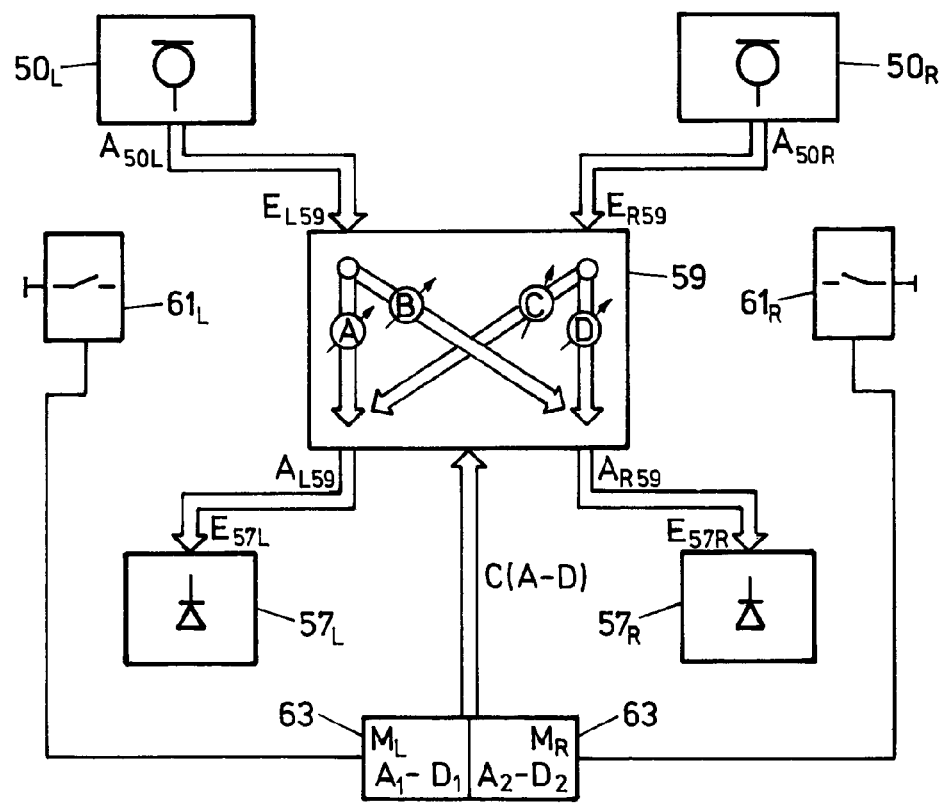

The present invention shall now be further exemplified and described with the help of figures. The figures show:

FIG. 1 simplified and schematically, by means of a signal-flow/functional-block diagram, a communication system including a telephone handset and a hearing device system according to the first aspect of the present invention and operating according to the method under this first aspect;

FIG. 2 in schematic signal-flow/functional-block representation, controlled weighing of audio signals transmitted to a speaker unit of the hearing device of the system according to FIG. 1;

FIG. 3 a binaural hearing device system within one embodiment of the system according to FIG. 1 in a simplified, schematic signal-flow/functional-block diagrammatic representation, showing respective attenuation controls between the microphone units and the speaker units of such hearing device system, according to a manually controlled master/slave operation;

FIG. 4 in a schematic, simplified signal-flow/functional-block diagrammatic representation, one embodiment of a system according to FIG. 1, wherein the telephone handset intrinsically comprises wireless short-range communication abilities which are exploited for the wireless communication as of the system of FIG. 1;

FIG. 5 in a simplified, schematic signal-flow/functional-block representation, one embodiment of a system according to FIG. 1, wherein the telephone handset is realized by a customary mobile phone and an added plug-on module;

FIG. 6 under a second aspect of the present invention and in a simplified schematic signal-flow/functional-block representation, an audio system comprising an audio device and a hearing device, whereat a wireless audio signal communication is established from the audio device to the hearing device;

FIG. 7 in a simplified, schematic signal-flow/functional-block representation, a binaural hearing device system with controllable attenuations between the respective microphone and speaker units, wherein the attenuations are controlled to establish manually and selectively master/slave relation of the two hearing devices according to a third aspect of the present invention;

FIG. 8 with respect to controlling of, enabling and disabling the mutual wireless communication between a telephone handset and a hearing device system as in FIG. 1, embodiments so as to disable the communication.

1.) Telephone to Hearing Device Communication

In FIG. 1 there is shown, by a most generic functional-block/signal-flow diagram, a system comprising a wireless telephone handset on one hand and a hearing device system on the other hand. The wireless telephone handset which may be e.g. a mobile phone or the handset of a phone wirelessly communicating with a desk station, comprises a long-range communication unit 3 (LRCU) with a respective antenna, which communication unit 3 establishes directly or via a desk station bi-directional communication for incoming and outgoing phone calls. The LRCU 3 is operationally connected to a processor unit 5. An output $A_5$ of the processor unit 5 is operationally connected to the input $E_7$ of a speaker unit 7. An input $E_5$ to the processor unit 5 is operationally connected to the output $A_9$ of a microphone unit 9. The units 3, 5, 7 and 9 represent units which are customarily provided at a wireless telephone handset as addressed. The units are integrated in a handset casing as schematically shown at 11.

On the other hand the system comprises a hearing device system which is to be worn by an individual in or adjacent to at least one of his ears. The hearing device system comprises at least one hearing device. The at least one hearing device comprises an input microphone arrangement 12, the output $A_{12}$ thereof being operationally connected to an input $E_{13}$ of a signal processing unit 13 of the hearing device. An output $A_{13}$ of the signal processing unit 13 is operationally connected to an input $E_{15}$ of an output electrical to mechanical converter unit 15, referred to in the following as "speaker unit". The hearing device is realized within at least one shell as schematically shown in FIG. 1 at 17.

As described up to now, the hearing device as well as the telephone handset are customary.

So as to realize communication between the telephone handset and the hearing device the hearing device is provided with a short-range wireless communication unit 19 (SRCU) which may receive and treat audio signals from an external transmission unit and which may be applied to processing unit 13 additionally or instead of the audio signals from the output $A_{12}$ of the microphone unit 12.

In FIG. 1 changeover of operational connection of the input $E_{13}$ to the processing unit 13 from the output $A_{12}$ to the output $A_{19}$ of the wireless SRCU 19 is schematically represented by switch $S_1$. The SRCU 19 is integrated into the hearing device shell 17.

The telephone handset has a SRCU 23, an input $E_{23}$ of which being operationally connectable to the output $A_5$ of the processing unit 5 instead of or additionally to speaker unit 7, as schematically shown by switch $S_2$.

According to one generic aspect of the present invention there is provided a distance detecting unit (DDU) 21 which detects a signal S(d) which is dependent from the mutual distance d of the hearing device to the telephone handset. As schematically shown in FIG. 1 the DDU 21 generates an output signal $S_{21}$ at output $A_{21}$ as soon as the distance d between the hearing device and the telephone handset becomes smaller than a predetermined threshold distance $d_o$ which is e.g. 15 to 30 cm. Upon detection of a distance d lower than $d_o$ the following operations are performed upon the system:

If not activated before, the wireless SRCU 23 is activated and the input thereof, $E_{23}$, is operatively connected to the output $A_5$ of the processing unit 5 at the telephone handset.

At the hearing device, the output $A_{19}$ of the wireless SRCU 19 is operationally connected to input $E_{13}$ of signal processing unit 13. If at the moment the distance between the telephone and the hearing device becomes lower than $d_o$ and an incoming call waits for acceptance, as schematically shown in FIG. 1 by the signal "$S_{cal}$" there is established as further schematically shown by combining unit 25, a call acceptance signal $S_{acc}$ to the processing unit 5 as soon as the signal $S_{21}$ is generated by DDU 21.

Thus, whenever the telephone handset is brought near to the ear equipped with the hearing device, wireless communication between the wireless SRCU 23 and SRCU 19 is established, and if there is an incoming call pending, such call is automatically accepted. Clearly it is also possible to control acceptance of an incoming call manually by accordingly operating a key (not shown) at the telephone handset or at the hearing device.

The operational connection by switching $S_1$ as shown in FIG. 1 may be realized by a two-state switch or by soft changeover as e.g. by a weighing unit 27 as shown in FIG. 2. Thereby, the output $A_{19}$ of the wireless SRCU 19 is operationally connected to an input of processing unit 13 via a controlled attenuation unit 29, whereas the output $A_{12}$ is operationally connected to an input of the processing unit 13 via a controlled attenuation unit 31. Thereby, the signal at the output of DDU 21 controls the unit 27 for an increased attenuation b relative to attenuation a whenever the mutual distance between telephone handset and the hearing device is lower than $d_o$. Thereby, instead of fully disabling the microphone unit 12, the influence of the output signal at $A_{12}$ of the addressed unit 12 is lowered by a desired amount relative to the output signal from $A_{19}$ upon the output signal of speaker unit 15.

The hearing device system may be realized as a system with a hearing device for each of individual's ears up to a binaural system, latter being schematically shown in FIG. 3. The left ear device comprises, in analogy to FIG. 1, the units $12_L$, $13_L$, $15_L$ and $19_L$ whereas the right ear device comprises the units $12_R$, $13_R$, $15_R$ and $19_R$. Both devices comprise respective wireless SRCU's $19_{L,R}$ if both devices and thus both ears of the individual are equipped so as to respectively establish communication with the telephone handset.

According to the approach as was explained with the help of FIG. 2 there is established controlled attenuations $b_L$, and $b_R$ between the respective microphone units $12_L$ and $12_R$ and the respective processing units $13_L$ and $13_R$, as well as controlled attenuations $a_R$ and $a_L$, between the outputs of the respective SRCU $19_L$, $19_R$ and the addressed respective processing units $13_L$, $13_R$.

There is further provided respectively controlled attenuations $d_L$ and $d_R$ between the outputs of the signal processing units $13_L$, $13_R$ and the respective speaker units $15_L$ and $15_R$. A controlled attenuation $c_{LR}$ governs the influence with which the possibly processed audio output signals of microphone unit $12_L$ and/or of SCRU $19_L$ influence the audio input signal towards electrical to mechanical converter unit $15_R$. Vice versa, a controlled attenuation $c_{RL}$ controls influence of the possibly preprocessed audio output signal of microphone unit $12_R$ and/or of SCRU $19_R$ upon audio input signal towards electrical to mechanical converter unit $15_L$. The two controlled attenuations $c_{RL}$ and $c_{LR}$ thus control respective influences of audio signals transmitted from one hearing device to the other hearing device, via the interdevice audio signal communication of the binaural hearing device system.

Each hearing device of the binaural system comprises a DDU $21_L$ and $21_R$ respectively. Their respective outputs $A_{21L}$ and $A_{21R}$ are operationally connected to an attenuation control unit 37, wherein e.g. in a table the desired settings of the attenuations a to d for the hearing devices, respectively for right ear or left ear telephone communications are stored. As shown by the arrow 39 schematically, the output of the attenuation control unit 37 controls the addressed attenuations a to d as shown in FIG. 3 in dependency of respective mutual phone positions to one of the hearing devices of the binaural hearing device system.

E.g. if the telephone handset is picked up by the individual and brought near to his left ear closer than $d_o$, e.g. 20 cm, then beside of establishing short-range wireless audio signal communication between the telephone handset and the left hearing device via SRCU 23 and $19_L$, the following signal transmissions may be established by accordingly setting the attenuations a to d: The input signal to the left ear speaker unit $15_L$ is made predominantly dependent upon the output signal of left ear wireless SRCU $19_L$. E.g. for safety reasons, the input signal to left ear speaker unit $15_L$ may additionally be kept dependent from output signal of left ear microphone unit $12_L$, significantly attenuated by $b_L$ relative to the signal from SRCU $19_L$ via low attenuation $a_L$.

Overall perception of the individual may further be optimized by transmitting an audio signal which is predominantly depending on the output signal of left ear SRCU $19_L$, also to the right ear hearing device, which is achieved by an appropriate adjustment of the attenuation $c_{LR}$ and $d_R$ to be relatively low. Further, right to left side device audio signal communication is significantly attenuated by appropriately setting a relatively high attenuation $c_{RL}$.

E.g. for safety reasons too the input signal to the speaker unit $15_R$ may contain an attenuated amount of the output signal from microphone unit $12_R$. The right ear wireless SRCU $19_R$ is switched off by accordingly setting the attenuation $a_R$ high or infinite.

Thus, by appropriate setting of the addressed attenuations a to d, upon manually bringing the telephone handset near to one of the two devices, wireless audio signal communication between the telephone handset and that one device is established, the audio signal wirelessly transmitted to the one hearing device is perceived by the individual at one or at both hearing devices. Acoustical signals which impinge during this operating mode upon the microphone unit of the other device may nevertheless be kept perceivable by the individual.

Turning back to the generic explanations in context especially with FIG. 1 one approach of realizing the addressed system is to exploit existing mobile phone technology as far as possible.

According to FIG. 4 the telephone handset 1 is a mobile phone. Mobile phones as today on the market are customarily equipped with wireless short-range audio signal communication abilities e.g. based on BLUETOOTH technology. According to the embodiment of FIG. 4 the wireless short-range audio signal communication ability 23' as built intrinsically into the mobile phone 1 is exploited for realizing the present invention under the just addressed aspect and thus for communicating with the hearing device system as of FIG. 1 or FIG. 3.

The DDU 21 is thereby integrated in the hearing device 10.

As long as the today existing and customarily built in wireless small-range audio signal communication abilities of mobile phones as e.g. based on BLUETOOTH technology, are rather highly power consuming and as, on the hearing device side, utmost care is to be taken to minimize power consumption, on the side of the mobile phone 1 the SRCU 23 may well be permanently activated, but on the hearing device side and as shown in dashed line the SRCU 19 is only activated by an on/off command, when the DDU 21 detects the addressed mutual d distance to be less than $d_o$.

Similar to hands-free wireless operation of the mobile phone 1 intercommunication between the two devices 1 and 10 is established. At the hearing device 10 upon the addressed distance detection the microphone unit 12 is switched off or, see FIG. 2, its audio output signal is attenuated and, instead, audio signals from the wireless SRCU 19 are at least predominantly exploited.

Depending on the specific intrinsic programming of the mobile phone, whenever intercommunication between the mobile phone 1 and the hearing device 10 is established, the mobile-inherent speaker 7 may be switched off or may be kept active without significantly disturbing communication via the hearing device.

This approach, i.e. exploiting the mobile-inherent ability of wireless short-range audio signal communicating is especially then of high interest when such ability resides on a technology which is less power-consuming than the today widely established BLUETOOTH technology.

The DDU 21 at the hearing device in the embodiment of FIG. 4 may be realized in different ways, as perfectly known to the skilled artisan. E.g. whenever the wireless SRCU 23, as e.g. the BLUETOOTH unit, is activated at the mobile phone 1 and, as also customary, polls, i.e. seeks for a neighboring device to establish communication, the strength of such polling signal may be monitored by the DDU 21.

Alternatively, radiation level from the LRCU 3 may be monitored by the DDU 21 to determine when the mobile reaches detection distance $d_o$ with respect to the hearing device 10.

Further, the DDU 21 may be realized by providing in one of the telephone handset and of the hearing device an acoustical source, e.g. a source for ultrasonic signals and detecting at the other device sound pressure level as an indication of the distance between the telephone headset and the one hearing device.

Clearly, other known short-range distance monitoring techniques may be used, keeping an eye on low power consumption at the hearing device.

For using today's established mobile phones, which intrinsically make use of BLUETOOTH technology for wireless short-range audio signal communication with external devices, FIG. 5 shows a further embodiment.

According to the embodiment of FIG. 5 the mobile 1 comprises again the units 3, 5, 7, 9 as well as mobile-integrated wireless SRCU 23. Customarily, such mobile 1 comprises a plug-in socket 39. For wired hands-free operation, one pin of socket 39 is thereby operationally connected to the audio input $E_5$ of the processing unit 5, schematically shown in FIG. 5 by 39a. A second pin 39b of socket 39 is operationally connected to the audio output $A_5$ of processing unit 5. A third pin 39c of socket 39 is operationally connected to a control input $C_5$ of processing unit 5. There is applied to the mobile phone 1 a plug-on module 41. The plug-on module 41 comprises a very low-range wireless communication unit VLRCU 23a, the input of which being operationally connected to pin 39b of the socket 39. The plug-on module 41 further comprises a microphone unit 9a, the input of which being operationally connected to pin 39a of socket 39. Further, as shown in FIG. 5, the wireless VLRCU 23a has a control signal output which is operationally connected to pin 39c of socket 39.

Plugging in the plug-on module 41 to the mobile phone 1 is recognized by the mobile phone 1 as connecting a wired headset to the mobile, in which headset-mode the audio signal from processor unit 5 is led to the speaker of the headset, whereas the microphone output signal of the headset is led to the processing unit 5 instead of the audio output signal of microphone 9 integrated in the mobile. Thus, in headset operating mode, "believed" to be established by the mobile phone when plug-on module 41 is applied, the microphone unit 9 as well as the speaker unit 7 integrated in the mobile 1 are disabled as schematically shown by the switches $S_7$ and $S_9$ in FIG. 5. Nevertheless, in the plug-on module 41 the audio output signal form $A_5$ of processing unit 5 is operationally connected to the VLRCU 23a instead of to the headset speaker 7, wherefrom it is transmitted to the wireless VLRCU 19a in the hearing device 10. As the communication between the units 23a and 19a is only established when there is detected a small distance, let us say of at most 25 cm, between the mobile phone 1 with plug-on module 41 and the hearing device 10, a very low-power consuming, wireless communication technique may be used.

Because for the headset operating mode as "seen" from the mobile phone 1 when the plug-on module 41 is applied, the microphone 9 of the mobile phone 1 is disabled, so as to be able to use any today customary mobile phone without changing its programming or construction to realize the present invention, the disabled mobile phone microphone unit 9 is replaced by the microphone unit 9a at the plug-on module 41 which is operationally connected to the audio input $E_5$ to processing unit 5.

The wireless VLRCU 23a constantly polls, i.e. constantly seeks for an external unit with which it might communicate. Therefore, the DDU 21 may be realized in the hearing device 10 to detect whenever the distance d between the devices 1 and 10 becomes smaller than threshold distance $d_o$ by monitoring the polling signal emitted by VLRCU 23a with respect to reaching a predetermined threshold value. Whenever DDU 21 detects that the two devices 1 and 10 are distant by less than $d_o$, on one hand a control signal $S_{c27}$ to unit 27 is generated, so as to control the output of the VLRCU 19a to become the predominant audio input to the processor unit 13. On the other hand a control signal $S_{acc}$ is generated and transmitted via VLRCU 19a, VLRCU 23a to control input C5 of processing unit 5, so as to establish automatically call acceptance. At least for such a control signal the VLRCU 19a operates as transmission unit, whereas the VLRCU 23a operates as receiving unit.

Clearly, the hearing device system with a single hearing device 10 may be replaced by a system with two hearing devices, as e.g. described with the help of FIG. 3.

If departing from the configuration of FIG. 5 two hearing devices 10 are provided for each of individual's ears which are operated either as two independent hearing devices or as hearing devices of a binaural hearing device system with intercommunication between the hearing devices, be it merely for control signals or additionally for audio signals, then the VLRCU 23a may either communicate with only one of the two hearing devices or may directly communicate with both hearing devices, i.e. with both VLRCU 19a of the two hearing devices.

By means of the embodiment as of FIG. 5 today mobile phones may be wirelessly connected to the hearing device system. As soon as the mobile phone 1 rings, the individual wearing the hearing device system takes up the mobile and approaches it to the one or to one of the two hearing devices. As soon as the mutual distance d falls short of a predetermined distance threshold, the audio signal from the mobile is wirelessly transmitted to the hearing device system, and the individual may use the mobile phone as customary with significantly improved audibility.

Having discussed the present invention under the aspect of different embodiments for telephone handset to hearing device system wireless communication, some topics which have been exploited in the addressed context are considered inventive per se.

One of these topics or aspects is, generically, to establish wireless communication between an existing audio device as e.g. an MP3 player, a personal computer, a laptop, stereo equipment, TV. The second aspect or topic is to select at a binaural hearing device system a master/slave mode.

2.) Audio Device to Hearing Device Wireless Communication

In context with FIG. 5 and with an eye on mobile phone to hearing device system wireless communication we have exemplified how, departing from an existing unchanged mobile phone, a wireless communication is established to the hearing device system. This is realized according to the embodiment according to FIG. 5 by providing a plug-on module to the mobile phone. The plug-on module 41 incorporates all the measures additional to those intrinsic for the mobile which are necessary to establish the addressed communication.

This concept may be more generically applied for establishing wireless communication between any existing, unchanged audio system and a hearing device system. The only condition for the existing audio device is that it provides for an audio signal output plug.

In FIG. 6 there is schematically shown an audio system 40 which may be, as was addressed, e.g. an MP3 player, a CD player, a personal computer, a laptop, a stereo equipment, a TV set etc. All these audio systems 40 operate customarily with an internal or external loudspeaker arrangement 42. These systems further have customarily as well an output plug 44 to which the audio signal is transmitted from the output of an audio signal processing unit 46. Normally, the mono or stereo output plug 44 is used to plug in a set of headphones. Thereby, whenever such set is plugged to plug 44, the audio output to the speaker arrangement 42 is disconnected or disabled as schematically shown in FIG. 6 by switch $S_{42}$. So as to establish wireless audio signal communication from such audio system 40 to a hearing device system, a module 46 is applied to the audio system 40. The module 46 comprises a SRCU or a VSRCU 48, the input thereof being operationally connected to plug 44. The hearing device system 50 is built up in analogy to the hearing device systems which were discussed up to now, e.g. according to FIG. 3 or FIG. 5, with the exception that in this embodiment no distance detection is performed. The wireless signal transmission technique which is applied to transmit the audio signals from SRCU 48 to unit $19_b$ at the hearing device system 50 or to a binaural hearing device system as was exemplified with the help of FIG. 3 is selected on one hand taking into account power consumption at the hearing device system by unit $19_b$ and, on the other hand, the desired distance over which the addressed wireless transmission shall operate.

As shown in a simple mode in FIG. 6, audio signal transmission by SRCU or VSRCU 48 is established by manually operating a control switch 52 at module 46. Upon such initiation of signal transmission, the wireless transmission unit $19_b$ on the hearing device system 50 generates a control signal to weighing unit 27, whereat audio signals from the output $A_{19}$ of unit $19_b$ are weighed to become at least predominant if not exclusive to act on the input $E_{13}$ of the signal processing unit 13. Clearly, if the individual wears a binaural hearing device system relative attenuations are controlled as was exemplified for the system according to FIG. 3.

3.) Operation Control in Master/Slave Mode

With an eye on the third aspect of the present invention, according to FIG. 3, according to which wireless communication is established between a telephone handset and one of the hearing devices of a binaural hearing device system we have explained that by manually approaching the telephone handset close to one of the two hearing devices, wireless communication from the telephone handset to the addressed one hearing device is established on one hand, and, on the other hand, the addressed one hearing device becomes operating as the master of the two hearing devices. Thereby, audio signals which are received at the SRCU or VSRCU of the addressed one hearing device are those audio signals which at least predominantly if not exclusively govern the mechanical output signals of the system, which are perceived by the individual wearing the hearing device system.

Thus, under consideration that manually moving the phone handset towards one of the two hearing devices is a manual action performed by the individual, the governance of establishing one of the two hearing devices as the master is manually controlled by the individual in the addressed embodiment.

From the US 2004/0175008 A1 which accords to the EP 1 320 281 there is known as shown in FIG. 7, a binaural system of hearing devices comprising a left-ear hearing device with a microphone unit $50_L$ and an output speaker unit $57_L$. In analogy, the right-ear hearing device comprises a microphone unit $50_R$ and a speaker unit $57_R$. Signal processing of the audio signal at the respective outputs of the microphone units $50_L$ and $50_R$ to result in audio signals at the inputs of the respective speaker units $57_L$ and $57_R$ is performed generically by a signal processing unit 59. Signal processing by this unit 59 may be performed at the one and/or at the other hearing device or even in between, i.e. along the communication link which is established between the two hearing devices of the binaural system. In the generalized representation as of FIG. 7, where general signal processing is addressed by the unit 59 irrespective where such signal processing is physically realized, the processing unit 59 has an input $E_{L59}$ operationally connected to the output $A_{50L}$ of microphone unit $50_L$ and an input $E_{R59}$ operationally connected to the output $A_{50R}$ of microphone unit $50_R$.

The result audio signals of signal processing in unit 59 are delivered to an output $A_{L59}$ operationally connected to an input $E_{57L}$ of the speaker unit $57_L$ and to an output $A_{R59}$ operationally connected to the input $E_{57R}$ of the speaker unit $57_R$.

Signal transmission from input $E_{L59}$ to output $A_{L59}$ is performed via a controllable transfer characteristic A, signal transmission from the addressed input $E_{L59}$ to the output $A_{R59}$ via a controlled signal transfer characteristic B. Signal transmission from input $E_{R59}$ to output $A_{L59}$ is performed via a controllable signal transfer characteristic C and signal transmission from the addressed input $E_{R59}$ to output $A_{R59}$ via a controllable transfer characteristic D. The transfer characteristics A to D are normally frequency dependent.

If we compare the embodiment according to FIG. 7 with the embodiment according to FIG. 3 there may be seen that the transfer characteristic A according to FIG. 7 is a function $F_A$ of attenuation $a_L$ and $b_L$ as well as from attenuation $d_L$. Thus, there is valid according to this comparison:

$$A = F_A(a_L, b_L, d_L)$$

$$B = F_B(a_L, b_L, c_{LR}, d_R)$$

$$C = F_C(a_R, b_R, c_{RL}, d_L)$$

$$D = F(a_R, b_R, d_R)$$

When considering master/slave operation of the system as of FIG. 7 taking as an example the left-ear device as master and considering mere amplification or attenuation of signal power by the transfer functions A to D, there is valid $$|A| > |C| \text{ up to } |C| \text{ becoming 0.}$$

There is further valid $$|B| > |C|.$$

The respective weighing of |B| relative to |A| may be selected to provide optimum hearing performance for the individual, normally there will be valid |A|>|B|

Thus, summarizing in the addressed master/slave mode the acoustical signals impinging on the microphone unit of the master, or with an eye on FIG. 3 the audio signals which are wirelessly transmitted to the input of the wireless communication unit of the master, are predominant with respect to hearing perception from the speaker units of the overall hearing device system.

As was already described in context with FIG. 3 controlling the addressed binaural system in a selected one of the two possible master/slave modes may be wanted by the individual at specific moments, if a source of audio signals is to be perceived selectively and predominantly by the one ear of the individual. Such situation may e.g. arise when a car driver communicates with a rear seat passenger or, more general, an individual communicates with a neighbor person in noisy surrounding etc.

In the addressed US 2004/0175008 and EP 1 320 281 switching to the respective master/slave mode is performed upon the result of the classification of the acoustical surrounding to the individual wearing the binaural system.

According to the present invention under one aspect, such control is specifically performed by the individual, manually. A manual action upon that hearing device of the binaural system which shall be established as the master initiates adaptation of the transfer functions A to D as of FIG. 7 to establish that one hearing device as the master. Clearly, it is also possible to manually interact with that hearing device of the binaural system which shall be the slave to establish the addressed master/slave operating mode as described.

Thus, according to FIG. 7 there is provided at the left-ear device a manually operable control unit $61_L$ and at the right-ear device of the binaural system a respective manually operable control unit $61_R$. The outputs of the two manually operable control units $61_L$ and $61_R$ are operationally connected to a transfer function setting unit 63. Therein, the transfer functions A to D to be set when the left-ear device is selected—$M_L$—as master device, as selected by manually acting upon control unit $61_L$ are stored as $A_1$ to $D_1$, accordingly for the right device master mode $M_R$, as $A_2$ to $D_2$. Thus, by selectively manually acting on one of the two control units $61_L$ or $61_R$ the respective device of the binaural system is selected as a master and accordingly the transfer functions A to D are set.

The manually operable control units $61_L$ and $61_R$ may be realized by respective manually operable keys or switches at the hearing devices or may be realized by a DDU as of $21_L$ and $21_R$ addressed in context with FIG. 3 or in any other known technique, by which a two-state control signal is switched by a manual operation of the individual. We refer e.g. to the US 2005/0074128 which accords with EP 1 424 873, wherein there is described a technique according to which by passing individual's hand nearby an in-the-ear or a completely-in-the-ear hearing device such device is made unstable due to changed acoustical impedance seen by the device. This instable mode of the device is exploited to switch the hearing device from one stable operating mode to another stable operating mode. Although this technique may perfectly be used for manually switching the system as of FIG. 7 into the one or into the other master/slave mode, it must be addressed that this technique of "switching by caused instability" is, at first, not suited for detecting a phone handset to be close to one of the devices, because maintaining the phone nearby the one ear would establish permanent instability of the addressed hearing device as long as the phone remains in the addressed nearby position.

The addressed manual switching by caused instability may nevertheless be exploited also for telephone communication as was addressed, if system instability is caused whenever the phone is held at a small distance to the hearing device, let us say 2 cm, and such instability is vanishing as soon as the phone is moved to a larger distance from the device, e.g. farer away than the just addressed 2 cm.

By such an approach the addressed technique of "switching by caused instability" may also be used in the sense of the DDU 21 as was addressed in context with FIG. 1 to 5.

Figure 8A:
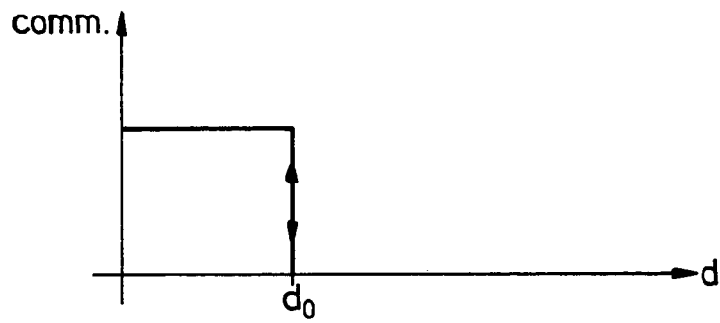

As we have discussed in context with telephone to hearing device communication according to the FIGS. 1 to 5, according to one aspect of the present invention such audio signal communication is established as soon as a mutual distance d between the telephone handset and one of the hearing devices of a hearing device system falls below a distance threshold value $d_o$. For disabling such wireless communication different possibilities may be realized, as schematically shown in FIG. 8. In FIG. 8a there is shown, in dependency of the mutual distance d between the handset and the one hearing device considered, the established wireless audio-signal communication "comm". As soon as d falls below the threshold value $d$, communication comm. according to FIG. 1 between SRCU 23 and 19 is established and is disabled as soon as the addressed distance d becomes again larger than the addressed threshold value $d_o$. This may be disadvantageous if e.g. during a telephone communication the individual with the one hearing device and the handset desires to deposit the handset on his desk so as to have both hands free e.g. to look for a paper. According to the enabling/disabling operation according to FIG. 8a in such a case the communication might easily be interrupted. This is remedied by establishing still according to the embodiment of FIG. 8a a predetermined time span T, during which the mutual distance d may be larger than $d_o$, up to interrupting or disabling the established communication.

Figure 8B:
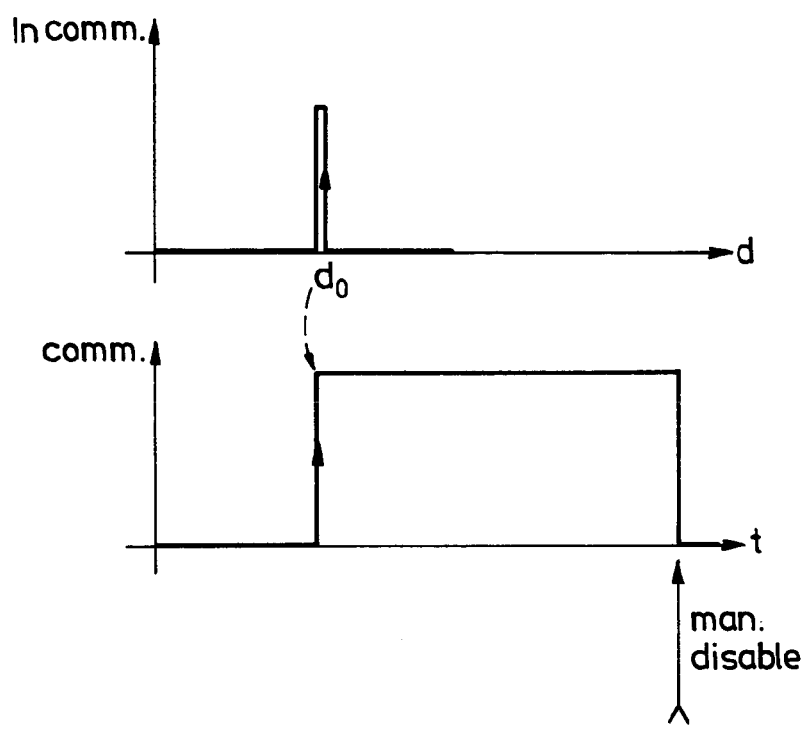

In FIG. 8b there is shown a different approach for disabling an established audio communication. According to FIG. 8b once the mutual distance d falls below $d_o$ a triggering signal IN.comm. is established, which initiates the addressed audio signal communication comm. between the telephone handset and the one hearing device of the hearing device system. Disabling the addressed communication comm. once established is performed independently of the actual distance d between the telephone handset and the one hearing device and is established by a manual interaction of the individual e.g. and preferably upon the telephone handset as in normal telephone operation by touching a disabling control key on the telephone handset, as schematically indicated in FIG. 8b by "man.disable".

As respective techniques which may be applied for realizing either of the possibilities to disconnect the handset from the addressed hearing device are perfectly known to the skilled artisan, the respective realization forms have not been shown in the signal-flow/functional-block diagram representation as of FIG. 1 so as not to burden the figure by additional measures which are, per se and with respect to their realization, clear to the skilled artisan once having been taught as by FIG. 8 the principles which may be realized.

The invention claimed is:

1. A method for establishing wireless communication between a telephone handset and a hearing device system comprising at least first and second hearing devices, the first hearing device having a first microphone unit, the output of the first microphone unit being operationally connected to an input of a first speaker unit at said first hearing device, and the second hearing device having a second microphone unit, the output of the second microphone unit being operationally connected to an input of a second speaker unit, the method comprising:
    monitoring when a mutual distance between the first hearing device and said telephone handset becomes shorter than a predetermined distance threshold;
    when the monitoring determines that the mutual distance is shorter than the predetermined distance threshold:
        establishing a wireless short-range audio signal communication from said telephone handset to the first hearing device of said hearing device system; and
        establishing an input signal to the first speaker unit to be at least predominantly governed by audio signals transmitted by said wireless short-range audio signal communication; and
        disabling said wireless short-range audio signal communication after a predetermined time span during which said mutual distance between the first hearing device and said telephone handset remains above said predetermined distance threshold.

2. The method of claim 1, wherein said wireless short-range audio signal communication is by BLUETOOTH technology.

3. A communication system comprising:
    a telephone handset having a wireless short-range audio signal communication unit;
    a hearing device system comprising a first hearing device and a second hearing device, said first hearing device comprising a first microphone unit, the output of the first microphone unit being operationally connected to an input of a first speaker unit of said first hearing device, and a wireless short-range audio signal communication unit, the output of the wireless short-range audio signal communication unit of said first hearing device being operationally connected to said input of said first speaker unit, and said second hearing device comprising a second microphone unit, the output of the second microphone unit being operationally connected to an input of a second speaker unit at said second hearing device;
    said communication system further comprising a distance detecting unit generating a control signal whenever a distance between said telephone handset and said first hearing device falls below a predetermined distance threshold, said control signal establishing operational connection from said wireless short-range audio signal communication unit of said telephone handset via said wireless short-range audio signal communication unit of said first hearing device to said input of said first speaker unit,
    wherein said distance detecting unit generates a further control signal after said distance between said telephone handset and said first hearing device rises above said predetermined distance threshold, said further control signal at least initiating disabling of said operational connection from said wireless short-range audio signal communication unit of said telephone handset via said wireless short-range audio signal communication unit of said first hearing device to said input of said first speaker will after a predetermined time span during which the distance between said telephone handset and said first hearing device remains above said predetermined distance threshold.

4. The communication system of claim 3, further comprising a further controlled attenuation unit having a control input operationally interconnected between an output of said second microphone unit at said second hearing device and said input of said first speaker unit at said first hearing device, said control signal being operationally connected to said control input of said further controlled attenuation unit and establishing an increased attenuation at said further controlled attenuation unit.

5. The communication system of claim 3, wherein said wireless short-range audio signal communication unit of said telephone handset is integrated into said telephone handset.

6. The communication system of claim 3, wherein said telephone handset comprises a telephone handset unit and a plug-on module removably applicable to said telephone handset unit, said telephone handset unit having a plug-in pin for tapping off an input signal to a speaker unit of said telephone handset unit, said plug-on module comprising said wireless short-range audio signal communication unit of said telephone handset, the input of which being operationally connected and plugged to said plug-in pin.

7. The communication system of claim 6, said telephone handset unit having a further plug-in pin for input audio signals to said telephone handset unit, said plug-on module comprising a microphone unit operationally connected and plugged to said further plug-in pin.

8. The communication system of claim 6 or 7, wherein said telephone handset will comprises a connecting pill arrangement for a wired hands-free operation unit, said plug-on module being plugged to said connecting pin arrangement.

* * * * *